US009499429B2

(12) United States Patent
Spezzani (10) Patent No.: US 9,499,429 B2
(45) Date of Patent: Nov. 22, 2016

(54) KILN FOR ANNEALING GLASS SLABS

(75) Inventor: Stefano Spezzani, Baiso (IT)

(73) Assignee: KERAGLASS INDUSTRIES S.R.L., Baiso (RE) (IT)

( * ) Notice: Subject to any disclaimer, the term of this patent is extended or adjusted under 35 U.S.C. 154(b) by 464 days.

(21) Appl. No.: 13/545,342

(22) Filed: Jul. 10, 2012

(65) Prior Publication Data

US 2013/0025324 A1 Jan. 31, 2013

(30) Foreign Application Priority Data

Jul. 25, 2011 (IT) .............................. RE2011A0055

(51) Int. Cl.
*C03B 27/00* (2006.01)
*C03B 25/08* (2006.01)
*C03B 25/02* (2006.01)

(52) U.S. Cl.
CPC ............. *C03B 25/08* (2013.01); *C03B 25/025* (2013.01)

(58) Field of Classification Search
CPC ..... C03B 25/02; C03B 25/025; C03B 25/08; C03B 25/093; C03B 25/12
USPC ........................... 165/48.1, 61, 80.5; 65/348
See application file for complete search history.

(56) References Cited

U.S. PATENT DOCUMENTS

| | | | |
|---|---|---|---|
| 3,393,062 A * | 7/1968 | Hesten et al. .................. | 65/115 |
| 4,591,374 A * | 5/1986 | Klemola ......................... | 65/350 |
| RE32,497 E * | 9/1987 | Canfield ......................... | 65/162 |
| 5,607,009 A | 3/1997 | Turner et al. | |
| 6,787,485 B1 | 9/2004 | Probst | |
| 2004/0148969 A1* | 8/2004 | Nikander ........................ | 65/114 |
| 2009/0100875 A1* | 4/2009 | Engels et al. .................. | 65/114 |

FOREIGN PATENT DOCUMENTS

| | | | | |
|---|---|---|---|---|
| EP | 0902763 B1 | 8/2006 | | |
| FR | 1117106 A | 5/1956 | | |
| JP | 2002179431 A * | 6/2002 | ............ | C03B 32/00 |
| WO | 9803439 A1 | 1/1998 | | |
| WO | WO 2004037734 A2 * | 5/2004 | ............ | C03B 29/08 |

OTHER PUBLICATIONS

JP 2002179431 (Thomson Reuters Translation), [retrieved on Feb. 28, 2012], submitted by Applicant on Jul. 10, 2012.*

* cited by examiner

*Primary Examiner* — Michael H Wilson
*Assistant Examiner* — Yana B Krinker
(74) *Attorney, Agent, or Firm* — Volpe and Koenig, P.C.

(57) ABSTRACT

A kiln (10) for annealing glass slabs, which comprises a plurality of heating chambers (20) that are reciprocally superposed and independent, each heating chamber (20) being provided with: at least an access mouth (24, 25) for passage of at least a glass slab (L), a motorized roller plane (30) on which the glass slab (L) rests and moves, heating means (40) suitable for heating the glass slab (L) located in the heating chamber (20) and cooling means (50) suitable for commanding controlled cooling of the heating chamber (20).

10 Claims, 6 Drawing Sheets

KILN FOR ANNEALING GLASS SLABS

TECHNICAL FIELD

The present invention relates to a kiln for annealing slabs of glass. In more detail, the invention relates to a kiln for annealing glass slabs, suitable for re-heating and subsequent cooling of glass slabs to be subjected to following operations or treatments, or, more simply, suitable for eliminating internal stresses in the glass which occur during the steps of reheating glass slabs.

PRIOR ART

As is known, following certain heat treatment operations on glass slabs, or forming processes, or pre-firing of glaze on the surfaces, internal stresses are caused in the glass which, if not relieved, make further operations impossible, such as cutting, grinding, perforating, or subsequent heat treatments, such as hardening.

To de-stress the glass, such as to be able to subject it to subsequent work operations, as is known, it is necessary to heat the glass slab to a temperature generally comprised between 550° C. and 650° C., and the cool the glass with a controlled cooling cycle that is sufficiently slow for further stresses not to be created internally of the glass.

Two known types of kiln are used for this purpose, the first of which includes a continuous roller kiln, in which the glass slabs enter a longitudinally-developing heating chamber and, as they move along the longitudinal development of the kiln, follow a heating cycle. At the end of the kiln the glass slabs transit to a controlled cooling station, in which they are made to undergo a cooling cycle which, for example, includes a first cooling tract, very slow and controlled, primarily indirect, in which the glass is stabilised, followed by a cooling tract which might also be more rapid and direct.

The first type of kiln, however, has the drawback that in order to perform a heating cycle followed by a cooling cycle on the glass slab very longitudinally-extended kilns are required, which need considerable space and significant investment for, obviously, high production levels.

The use of these kilns is therefore advantageous where large production scales are envisaged, characterised by long series.

The second type of kiln for annealing glass slabs comprises intermittent kilns, among which oscillating roller kilns. In these kilns, the heating chamber exhibits an extremely limited longitudinal development, in reality not much longer than the glass slabs to be treated, when large slabs were being treated, and the glass slabs are rested on a motorised roller plane which keeps them moving, with an oscillating motion, internally of the heating chamber, while heating means subject the glass slab to an appropriate heating cycle.

At the end of the heating cycle, the slab is subjected to a controlled cooling cycle, of the above-described type, or even a natural cooling cycle.

The smaller spatial dimension of these kilns, according to the known type of annealing kilns, has however a negative effect on production performance, as the number of glass slabs the kiln can treat is always a single slab for a heating cycle, if the slab is large, or a number of slabs such as to fill the area of the heating chamber, if small slabs are being treated.

Further, the energy efficiency of these kilns is lower than that of continuous kilns, as the heating cycle must be newly commenced at each inlet of a new and cold glass slab internally of the heating chamber.

An example of these kilns, according to the preamble of the independent claim, is described in document JP 2002 179431.

These kilns however exhibit the drawback of requiring a support slab suitable for supporting the glass slab such as to prevent it from deforming during the annealing process.

Further, the cooling of the glass slab in the single heating chamber cannot be done in a gradual and controlled way, as it is directly done by the opening of access and exit mouths of the heating chamber; in order to reduce the temperature of the glass slab as gradually as possible, therefore, it is necessary to transport a glass slab from a heating chamber at a higher temperature to a heating chamber which is set at a lower temperature than the first, with undoubted drawbacks in terms of efficiency, size of the kiln and speed of process, as well as in terms of good results from the annealing process.

An aim of the present invention is to obviate the above-described drawbacks of the prior art, with a solution that is simple, rational and relatively economical.

These aims are attained by the characteristics of the invention reported in the independent claim. The dependent claims delineate preferred and/or particularly advantageous aspects of the invention.

DISCLOSURE OF THE INVENTION

The invention in particular discloses a kiln for annealing glass slabs, characterised in that it comprises a plurality of heating chambers superposed on one another and independent, each heating chamber being provided with: at least an access mouth for passage of at least a glass slab, a motorised roller plane on which the glass slab rests and moves, heating means suitable for heating the glass slab located in the heating chamber, means for controlled cooling, suitable for indirectly and/or directly cooling the heating chamber.

In the invention, the cooling means comprise a plurality of tubes, in which a refrigerant fluid circulates, located internally of the heating chamber.

Thanks to this solution, the kiln for annealing glass slabs is particularly compact and, at the same time, enables high levels of production capacity to be reached, as a plurality of glass slabs can be treated contemporaneously in a space which, in plan view, is slightly greater than the spatial dimension of the glass slab to be treated.

Further, thanks to the cooling means as configured, a more efficient controlled cooling of each heating chamber can be obtained, making the annealing process of the glass slabs more effective and safer, with a consequently greater quality of the product obtained.

The glass slab is advantageously rested directly on the rollers which made up the motorised roller plane, without an interposing of support slabs, with a consequent reduction of heating and cooling times of the glass slabs to be subjected to annealing, an undoubted saving in energy, enabling at the same time treatment of even large-size glass slabs.

In a further aspect of the invention, each motorised roller plane is destined to move the glass slab with an oscillating motion internally of the respective heating chamber, with an oscillating velocity comprised for example between 0 and 1 m/s.

Each motorised roller plane is also provided with rollers located at a reciprocal distance, taken as an interaxis, substantially comprised between 50 and 150 mm, for example with a roller diameter substantially comprised between 30 and 120 mm.

Thanks to these specifications, it is possible without requiring any support slab of the glass slab to maintain the planarity or in any case the shape of the glass slab during the annealing thereof.

BRIEF DESCRIPTION OF THE DRAWINGS

Further characteristics and advantages of the invention will emerge from a reading of the following description, which is provided by way of non-limiting example, with the aid of the figures illustrated in the accompanying figures of the drawings.

BEST WAY OF CARRYING OUT THE INVENTION

With particular reference to the figures, 10 denotes in its entirety a kiln, for example a modular kiln, for annealing glass slabs, which are denoted generally by reference letter L and can be either flat or curved.

Figure 1:
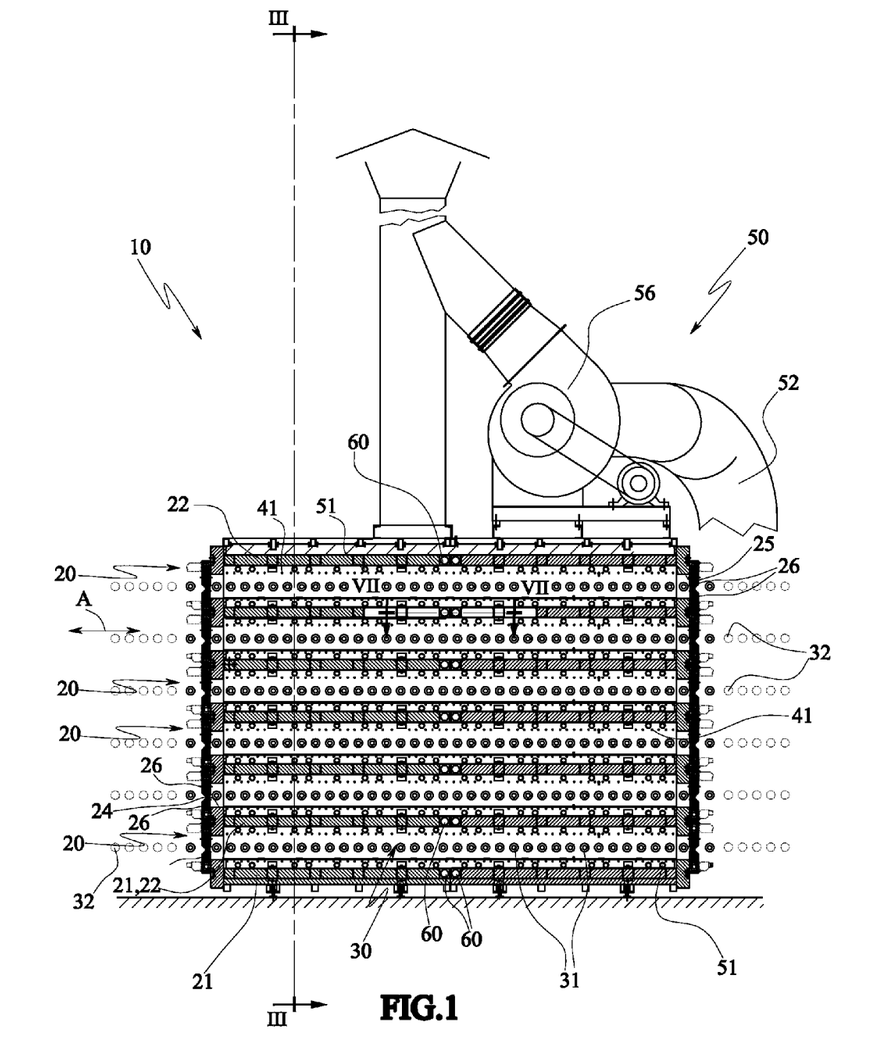
FIG. 1 is a section view along the section line I-I of FIG. 3, of an annealing kiln for glass slabs, according to the invention.

For the aims of the present invention, the kiln 10, as can be seen in FIG. 1, comprises a plurality of heating chambers 20 superposed on one another, for example fixed to one another and functionally independent of each other.

The heating chambers 20 are independent of one another, as a heating and/or cooling cycle of the glass slabs L can be performed in each chamber that is independent of what is performed in the other heating chambers 20, as will more clearly emerge from the following description.

Figure 2:
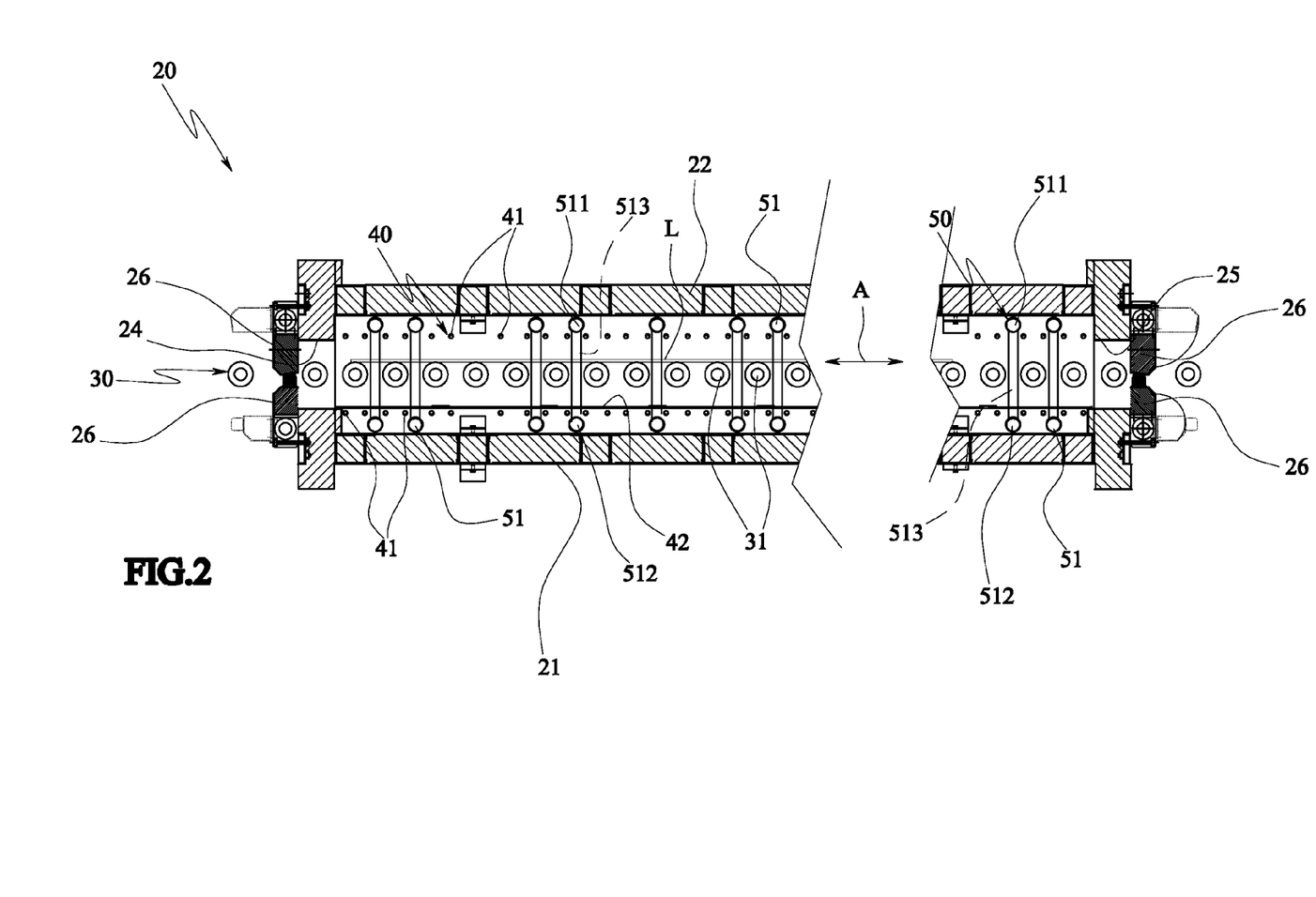
FIG. 2 is a detail of FIG. 1 in which one of the heating chambers of the kiln is illustrated.
Figure 4:
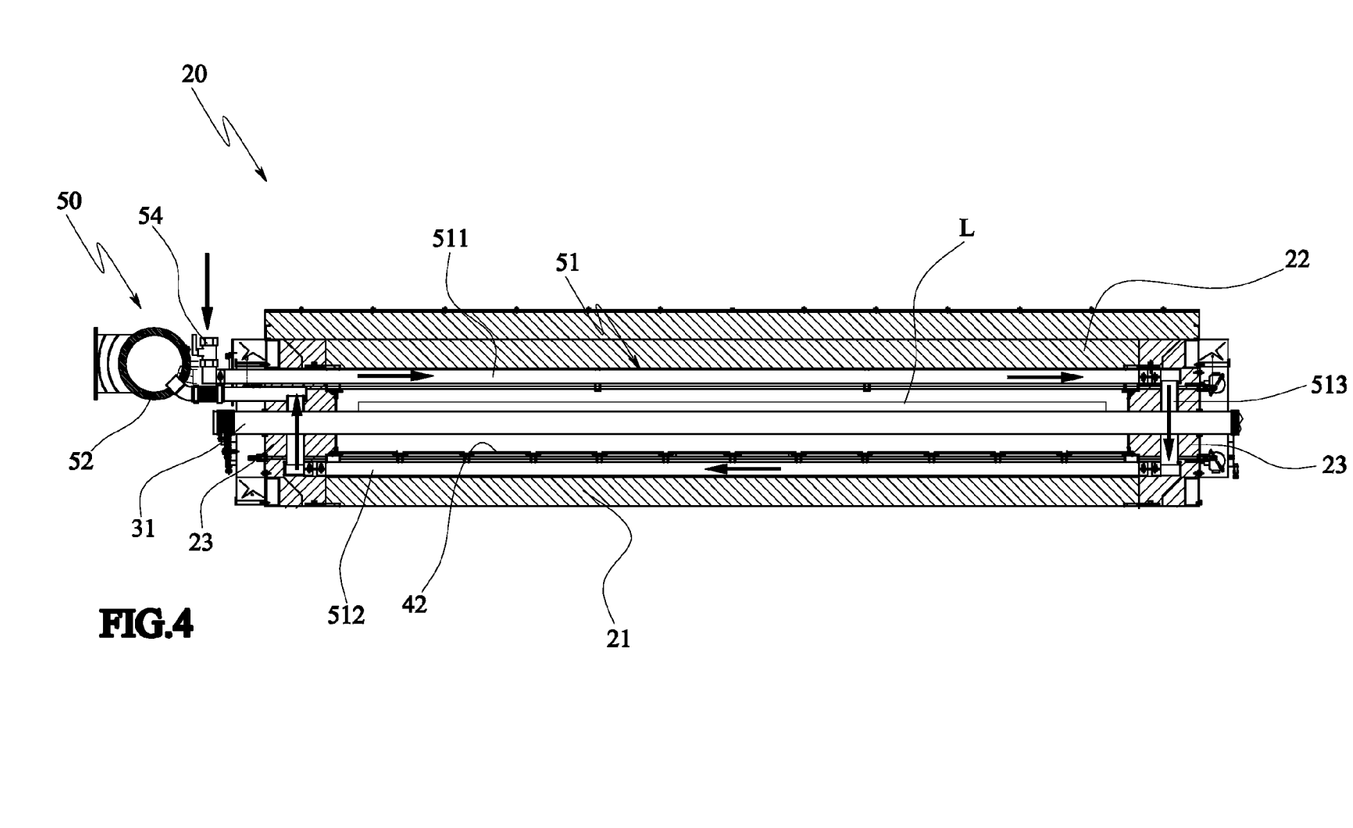
FIG. 4 is a detail of FIG. 3, in which the cooling means of one of the heating chambers of the kiln are illustrated.
Figure 5:
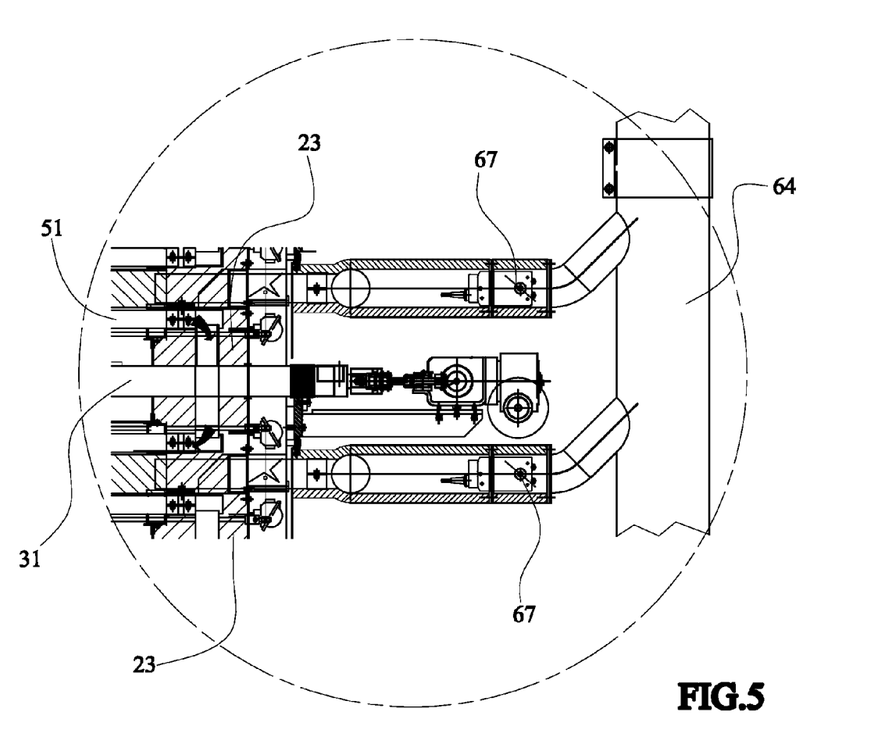
FIG. 5 is detail V of FIG. 3.

Each heating chamber 20, visible in detail in FIGS. 2 and 4, comprises a support frame conformed substantially as a channel, comprising a substantially-flat bottom element 21, a top element 22 (also flat or vaulted) and two lateral flanks 23 having a prevalently vertical development.

Further, the heating chamber 20 is provided with a first access mouth 24 and a second access mouth 25, which are afforded at the opposite frontal walls of the support frame.

The heating chamber 20 comprises a motorised roller plane 30, provided with a plurality of motorised rollers 31 and arranged substantially coplanar, which are interposed between the first access mouth 24 and the second access mouth 25, with a longitudinal axis that is perpendicular to the lateral flanks 23, which flanks support in rotation, via the interposing of bearings, the roller at the ends thereof.

Each motorised roller plane 30 is, generally, aligned to a pair of roller conveyors, schematically denoted by 32 in the figures and of known type, respectively located upstream and downstream of the kiln 10, which are destined to supply the glass slabs L to be subjected to annealing and collect the glass slabs L at the end of the heat treatment.

The rollers 31 thus define a rest plane on which at least a glass slab L rests and moves between the first access mouth 24 and the second access mouth 25 along the direction A perpendicular to the longitudinal axis of the rollers 31.

The rollers 31, for example, are hollow or solid rollers, made of silicon with steel extensions at respective ends.

In the illustrated embodiment, each motorised roller plane 30 comprises thirty-six rollers 31 located, for example, at a reciprocal distance of substantially 130 mm (which guarantees maintaining the shape of the glass slab L, including during the heating thereof) and motorised by a single motor as is known to the technical expert in the field; they could however exhibit different configurations according to needs of use.

In practice, the lateral flanks 23 of the heating chambers 20 can be realised in a single piece (or several pieces fixed to one another), and can be fixed to the various bottom elements 21, the first of which is provided with common ground-rests, and to the various top elements 22, such as to define a plurality of channels, in the example six in number and superposed and defining environments that are separate from one another.

Both the lateral flanks 23 and the bottom elements 21 and the top elements 22 are made of insulating material or material that is clad with an internal layer of insulating material; for example they are made of an external layer of carbon steel and an internal layer of stainless steel, between which a layer of ceramic fibre is interposed.

Each first access mouth 24 and each second access mouth 25 of each heating chamber 20 further comprises respective closing means suitable for being opened on command.

In practice, the closing means of an access mouth 24 and 25 consist in a pair of doors 26 hinged respectively to the bottom element 21 and to the top element 22 of the heating chamber 20 (in the drawings with the hinge axis substantially horizontal) and activated by respective actuators which command independent opening and closing thereof.

The doors 26 are such that the free ends thereof substantially reciprocally contact when in a position such as to close the heating chamber 20 (i.e. when located in the vertical position), interposing, for example, between two rollers 31 of the motorised roller plane 30, and are such as to be arranged (alternatively or contemporaneously) inferiorly and superiorly of the plane defined by the rollers 31 when in a position such as to open the heating chamber 20.

In the embodiment illustrated in the figures, the kiln 10 is of the type known as an oscillating kiln.

In practice, the motorised roller plane 30 of each heating chamber 20 is destined to restingly receive a single glass slab L, or more than one slab, for each annealing cycle thereof, and maintain it in oscillating motion internally of the heating chamber 20 for the time required for the heat treatment.

For example, in order to subject a glass slab L having dimensions of 3200×2600 mm to annealing heat treatment, the kiln 10 can exhibit heating chambers 20 having a length (distance between the access mouths 24 and 25) of substantially 4160 mm, guaranteeing a working run of 960 mm for supporting the glass slab L internally of the heating chamber.

In the example, once they have brought the glass slab L internally of the heating chamber 20 through one of the access mouths 24 or 25, the rollers 31 are commanded in rotation by motors provided with inverters and are rotated alternatively in the two movement directions such that the glass slab L performs an oscillating motion comprised between the first access mouth 24 and the second access mouth 25, and lastly enable the glass slab L to exit from one of the access mouths 24 or 25.

The heating chamber 20 comprises, in particular, means for heating 40 suitable for heating the glass slab L located in the heating chamber.

The heating means 40 comprise a plurality of electric resistances 41, which are located internally of the heating chamber 20, inferiorly and superiorly of the rest plane defined by the rollers 31, and heat the internal environment of each heating chamber 20 substantially by radiation.

In the preferred embodiment the electrical resistances 41 exhibit a substantially tubular conformation and are arranged with the longitudinal axis parallel to the longitudinal axis of the rollers 31 of the motorised roller plane 30, for example, such as to be offset in relation thereto.

The electrical resistances 41, in particular, are armoured and have a maximum temperature limit of between 750 and 800° C.

Each heating chamber 20 exhibits two lines of electrical resistances 41 located respectively above and below the line of rollers 31.

A protection element 42 is located above the lower line of electrical resistances 41 of each heating chamber 20; the protection element 42 is fixed to the lateral flanks 23, and is made of a heat-conducting material, for example a perforated steel sheet, which is interposed between the rollers 31 of the motorised roller plane 30 and the lower electrical resistances 41 themselves. The protection elements 42 are configured such as to retain any pieces of glass or other waste or drops which detach from the glass slab L during the annealing, i.e. during the time the glass slab L is on the rollers 31, while still enabling the heat developed by the lower electrical resistances to reach the glass slab by radiation.

The heating means 40 of each heating chamber 20 are independent of one another and are configured such as to perform heating cycles that are independent of each other, heating the heating chamber 20 in each cycle and therefore also heating the glass slab L to be subjected to annealing up to maximum temperatures comprised between 550 and 750° C.

Each heating chamber 20 advantageously comprises cooling means 50 suitable for commanding the controlled cooling of the heating chamber 20.

The cooling means 50 advantageously comprise a plurality of heat-exchanger tubes 51 internally of which a refrigerant fluid flows, for example air that is relatively cool with respect to the internal environment of the heating chamber 20, which elements are arranged such as to cross the internal environment of the heating chamber 20 and, for example, are fixed to the lateral flanks 23 thereof.

Figure 3:
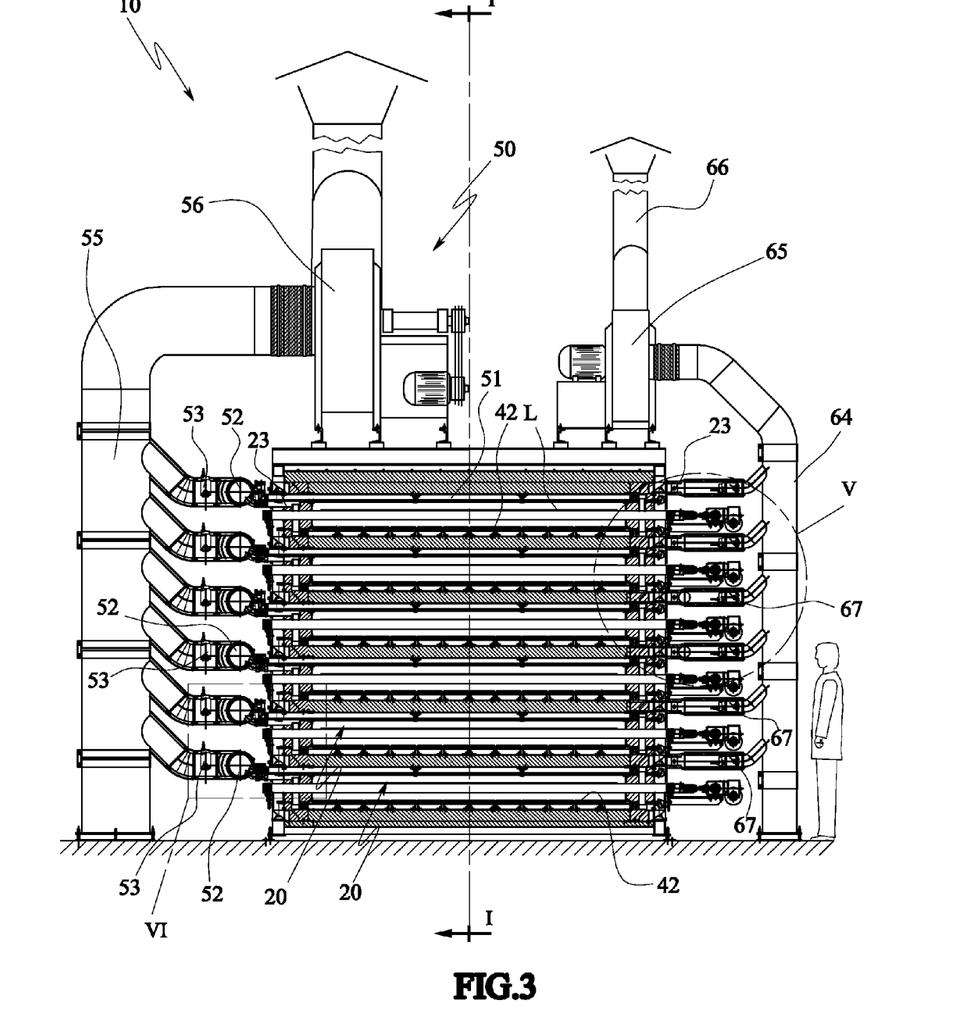
FIG. 3 is a view along the section line III-III of FIG. 1.
Figure 6:
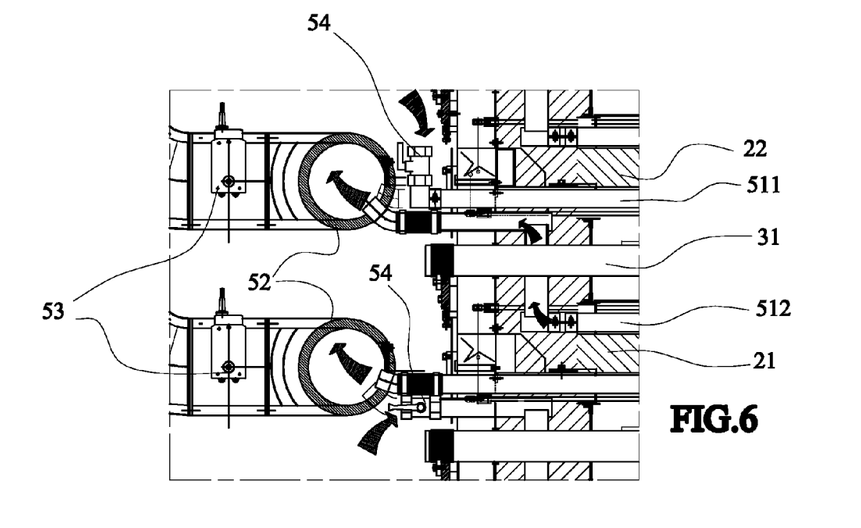
FIG. 6 is detail VI of FIG. 3.

As can be seen in FIGS. 3 and 6, each tube 52 of each heating chamber 20 is connected to a manifold 52, which is intercepted by a regulating valve 53 (for example provided with a servomotor activated by a thermocouple located internally of the heating chamber and a potentiometer) suitable for regulating the flow of refrigerating fluid circulating therein.

The tubes 51 are distributed along the whole of the heating chamber 20 and are arranged both inferiorly and superiorly of the plane defined by the rollers 31 of the motorised roller plane 30, such as to cool the heating chamber 20 substantially homogeneously.

In practice, the tubes 51 are arranged with the longitudinal axis thereof parallel to the longitudinal axis of the rollers 31 and such as to be offset thereto; for example, they are internal of the heating chamber 20, substantially flanked to the electrical resistances 41.

Each tube 51 exhibits a substantially U-shaped conformation, in which the two parallel tracts 511 and 512 (arranged horizontally) run respectively superiorly and inferiorly of the plane defined by the rollers 31 and the vertical tract 513 is arranged at one of the lateral flanks 23 of the heating chamber 20.

The tubes 51 of each heating chamber are, for example, all connected to one another in parallel.

The free end of the upper horizontal tract 522 of the tube 51 exits the heating chamber 20 through a hole made in a lateral flank 23, and is provided with a tap 54 destined to open and close the tube; the other free end of the tubes 51 (of the lower horizontal tract 512) is connected with the manifold 52, i.e. a horizontal-axis pipeline which flanks the heating chamber 20.

Possibly, with the aim of reducing the dimensions of the cooling means 50, some (half) the tubes 51 are located with the upper tract 511 connected to the tap 54 and the lower tract 512 to the manifold 52 (as described above), while the other tubes 51 exhibit the lower tract 512 connected to the tap 54 and the upper tract 511 to the manifold 52.

Each manifold 52, which is connected to all the tubes 51 of each heating chamber 20, is connected, via a main conduit 55 (with vertical axis), to a single pumping group, for example an aspirating ventilator 56, suitable for placing the tubes 51 in depression and collecting air externally of the heating chambers 20, via the free end of the upper tract 511 (when the tap 54 is open), and cause it to flow into each of the tubes 51.

The cooling means 50 enable a controlled cooling (slow and/or intervalled with steps of further heating or another cooling cycle, suitably determined) of the heating chamber 20 up to reaching a temperature of substantially 200-300° C., regulating the quantity of air which circulates in the tubes 51 and other significant parameters, such as to effectively de-stress the glass slab L; the further cooling of the glass slab L can also be done rapidly and without further control, as glass at below these temperatures is already sufficiently stable.

Each heating chamber 20 further comprises evacuating conduits 60 of the fumes or vapours which develop internally of the heating chamber during the annealing of the glass slab L, for example vapours due to decorating glazes that might be present on the glass slab, or other gases developing during the annealing process.

Figure 7:
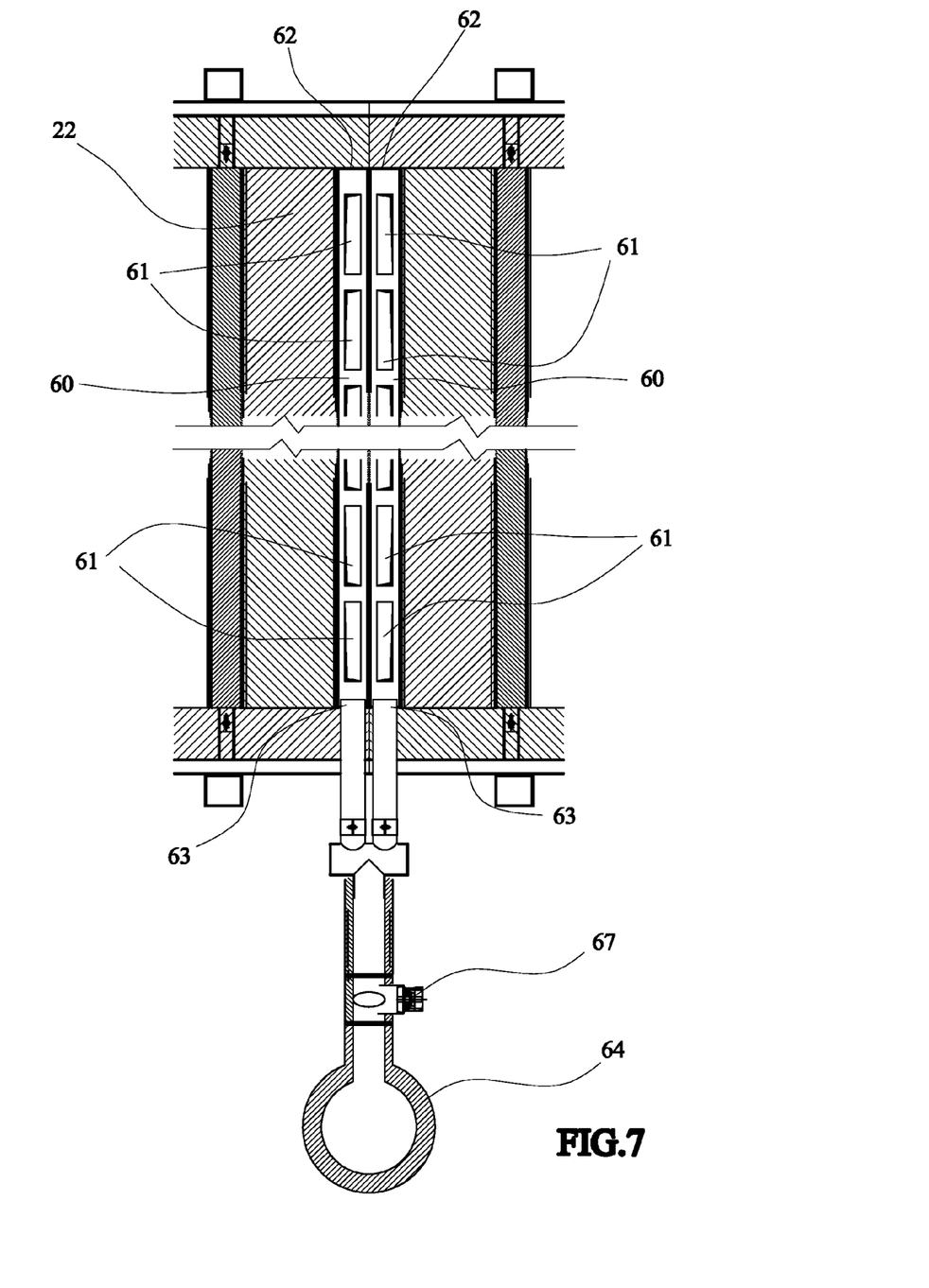
FIG. 7 is the view along section line VII-VII of FIG. 1.

Each heating chamber 20 comprises, in the example illustrated in the detail of FIG. 7, a pair of evacuating conduits 60 provided with open hatches 61, which are located at a central zone of the top element 22 of the heating chamber 20 and are arranged with the longitudinal axis substantially parallel to the longitudinal axis of the rollers 31 of the motorised roller plane 30 (with the hatches 61 facing towards the inside of the heating chamber 20).

All the evacuating conduits 60 exhibit a closed end 62 and an open end 63, which is connected to an aspirating conduit 64 common for all the heating chambers 20. The aspirating conduit 64 leads to a single aspirating fan 65, which sets the internal environment of each heating chamber 20 under depression, such as to aspirate the fumes that might be present therein, and connects to a single evacuation flue 66 of the fumes that is common for all the heating chambers 20.

Valve means 67 are further present on each evacuating conduit 60, for example a valve provided with a servomotor and a potentiometer, for regulating the outflow of the air from the heating chamber 20, which are suitable for closing and/or regulating the passage of the fumes exiting from each heating chamber 20 independently for each heating chamber.

The kiln 10 further comprises a control and command unit, for example controlled by a processor, destined to independently command the heating means 40, the cooling means 50, the opening and the closing of the closing means of the access mouths 24 and 25 (the doors 26) and the valve means 67 serving the evacuating conduits 60, of each heating chamber 20.

Further, the heating means 40 of each heating chamber 20 can comprise convectors suitable for blowing hot air internally of the heating chamber, such as to heat the glass slab L also by convection.

The convectors, for example, might of the high-pressure pulsating blower type arranged at the top element 22 of the heating chamber 20, such as to create turbulence of hot air (500-600° C.) in the upper zone of the heating chamber without involving the rollers 31 thereof.

In the light of the above, the kiln 10 functions as follows.

Via one of the roller conveyors 32 the glass slab L to be subjected to annealing is neared, for example, to the first access mouth 24 of a heating chamber 20, which will exhibit both the doors 26 in the open position (the doors 26 of the second access mouth 25 can at the same time remain closed or be open such as to allow a glass slab L, already subjected to the heat treatment) to exit.

Once the glass slab L is entirely contained internally of the heating chamber 20 (conveyed by the rollers 31) the control and command unit commands the closure of the doors 26 of the first access mouth 24 and the activating, in the two rotation directions, of the rollers 31, such that the glass slab L is constantly moved in an oscillating motion internally of the heating chamber 20.

The control and command unit contemporaneously activates the heating means 40, and the electrical resistances 41 begin the heating cycle of the heating chamber 20 and, therefore of the glass slab L maintained in motion. During the early steps of the heating, for example for the first fifteen minutes, the opening of the valve means 67 can be commanded (via the first control and command unit), which valve means 67 open the evacuating conduits 60 of the heating chamber 20, such as to be able to evacuate vapours produced by the glazes that might be present on the glass slab L.

Once the most suitable annealing temperature (550-650° C.) has been reached, the control and command unit commands the activating of the cooling means 50, activating the aspirating ventilator 56 and opening the regulating valve 53.

The relatively cool air aspirated internally of the tubes 51 enables, by heat exchange with the internal environment of the heating chamber 20, a lowering of the temperature of the heating chamber itself (in this stage without allowing cold air to enter directly into the heating chamber 20).

Should a particularly slow cooling gradient be required, it is possible to contemporaneously activate the heating means 40 together with the cooling means 50 for a few seconds.

Once the internal temperature of the heating chamber 20 has substantially reached 200-300° C., the cooling of the heating chamber 20 can be continued rapidly, for example, by commanding the opening of one or more doors 26 (all at the same time or one at a time) and/or by commanding the opening of the valve means 67 connected to the evacuating conduits 60.

The annealing treatment cycle of a glass slab L can contemporaneously be performed by one or more of the heating chambers 20 of the kiln 10, without a cycle being influenced by another. Further, some of the heating chambers 20 can be functioning while others can be switched off; in this way the kiln 10, beyond being extremely compact and functional, is particularly efficient (enabling treatment of several glass slabs L at the same time) and flexible.

The invention as it is conceived is susceptible to numerous modifications and variants, all falling within the ambit of the inventive concept.

Further, all the details can be replaced with other technically equivalent elements.

In practice, the materials used, as well as the contingent forms and dimensions, can be of any type according to needs, without the invention's forsaking the ambit of protection of the following claims.

The invention claimed is:

1. A kiln (10), for annealing glass slabs, comprising:
a plurality of heating chambers (20) that are reciprocally superposed and independent,
each heating chamber (20) comprising at least an access mouth (24, 25) for passage of at least one glass slab (L),
a motorized roller plane (30) on which the at least one glass slab (L) rests and moves, a heating device (40) configured to heat the at least one glass slab (L) located in the heating chamber (20) and
a cooling device (50) configured to command controlled cooling of the heating chamber (20),
the cooling device (50) comprises a plurality of tubes (51) in which a refrigerant fluid circulates, located internally of the heating chamber (20), wherein the tubes (51) of each heating chamber (20) are connected to a manifold (52) provided with a regulating valve (53) which regulates a flow rate of the refrigerant fluid circulating therein, and wherein each manifold (52) is connected, via a main conduit (55), to a single pump group (56) able to send the refrigerant fluid into each of the tubes (51), the tubes (51) being arranged inferiorly and superiorly of the rest plane of the glass slab (L) defined by the motorized roller plane (30).

2. The kiln (10) of claim 1, wherein the tubes (51) are fixed to walls (23) of the heating chamber (20).

3. The kiln (10) of claim 1, wherein the heating device (40) comprise a plurality of electrical resistances (41) located inferiorly and superiorly of the rest plane of the glass slab (L) defined by the motorized roller (30).

4. The kiln (10) of claim 3, wherein each heating chamber (20) comprises a plurality of protection elements (42), made of a heat-conducting material and interposed between the motorized roller plane (30) and the electrical resistances (41) located inferiorly of the motorized roller plane, configured such as to retain any pieces of glass which detach from the glass slab (L) during annealing.

5. The kiln (10) of claim 1, wherein each motorized roller plane (30) is suitable for moving the glass slab (L) with an oscillating motion internally of the respective heating chamber (20).

6. The kiln (10) of claim 5, wherein the glass slab (L) is moved by the motorized roller plane (30) with an oscillating velocity between 0 and 1 m/s.

7. The kiln (10) of claim 1, wherein each motorized roller plane (30) is provided with rollers (31) located at a reciprocal distance, taken as an interaxis, substantially between 50 and 150 mm.

8. The kiln (10) of claim 7, wherein the glass slab directly rests on the rollers (31) of the motorized roller plane (30).

9. The kiln (10) of claim 1, wherein each heating chamber (20) comprises evacuating conduits (60), for evacuating fumes that develop during the annealing of the glass slab (L), provided with valving (67) for regulating outflow of air from the heating chamber (20) and connected to a single evacuating flue of the fumes which is common for all the heating chambers (20).

10. The kiln (10) of claim 1, wherein each access mouth (24, 25) is provided with a closing device (26) configured to be opened on command.

\* \* \* \* \*